United States Patent [19]

Erickson et al.

[11] 3,759,083
[45] Sept. 18, 1973

[54] SENSING ELEMENT RESPONSE TIME MEASURING SYSTEM

[75] Inventors: Gerald L. Erickson, Rutland, Wash.;
David A. Jaszkowiak, Star, Idaho;
Joseph E. Kaveckis, Richland, Wash.

[73] Assignee: The United States of America as represented by the United States Atomic Energy Commission, Washington, D.C.

[22] Filed: Apr. 19, 1972

[21] Appl. No.: 245,337

[52] U.S. Cl. .................... 73/1 F, 73/15 A, 324/63
[51] Int. Cl. .................................... G01k 15/00
[58] Field of Search .................. 73/1 F, 15 A, 204

[56] References Cited
UNITED STATES PATENTS 3,498,128   3/1970   Calvet.................................. 73/204
3,533,273   10/1970   Green.................................. 73/15 A Primary Examiner—S. Clement Swisher
Attorney—Roland A. Anderson

[57] ABSTRACT

A resistance temperature detector, which is one arm of a bridge circuit, is heated by an electric current separate from the bridge exciting current, to a temperature higher than its environmental temperature. The time required for the RTD to cool through a predetermined temperature range after the heating current is removed is measured to determine the response time of the RTD.

7 Claims, 8 Drawing Figures

Patented Sept. 18, 1973 3,759,083

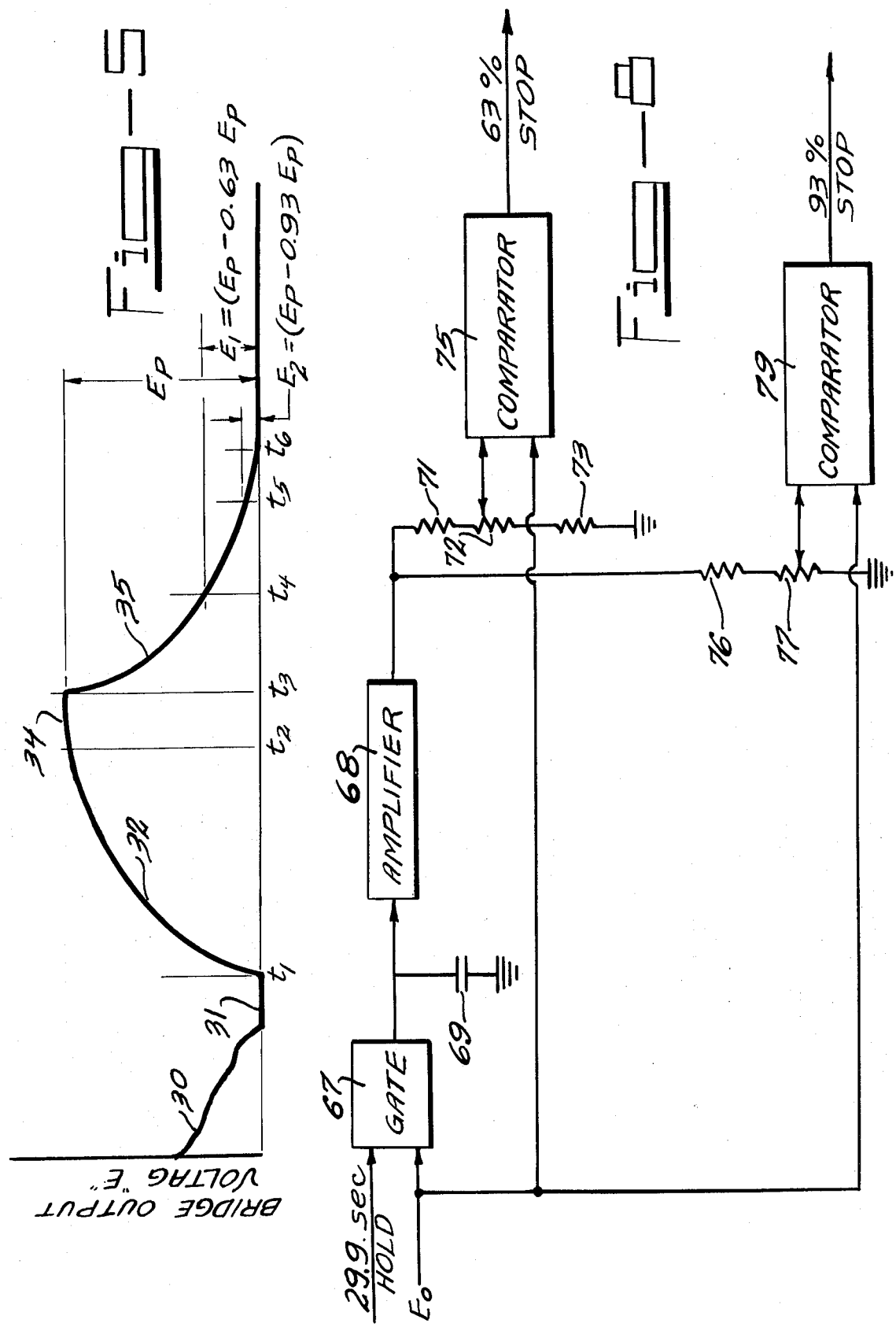

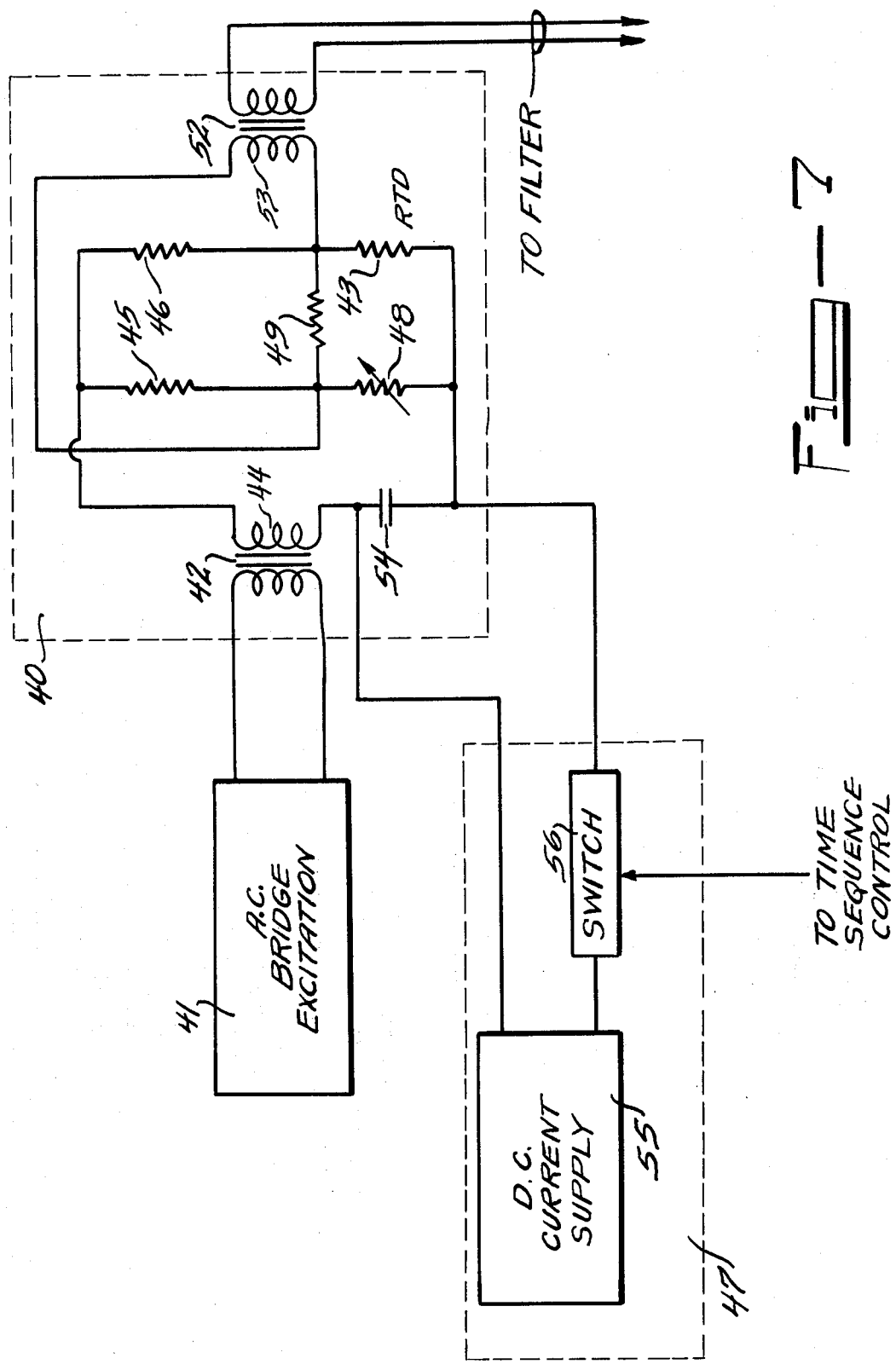

3,759,083

SENSING ELEMENT RESPONSE TIME MEASURING SYSTEM

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

A resistance temperature detector (RTD) is a two-terminal resistive element whose resistive value varies as a function of the temperature of its environment. In order to use the RTD as a temperature-sensing device, it is excited by an electrical current and resulting output voltage measured directly by series circuits of the ohmmeter type or, for more accurate applications, by a resistance bridge circuit. RTD's are placed in the various locations where the temperature is to be measured and are connected by cables to the measuring circuit so that the temperatures can be read remotely. Large numbers of these devices are used in many applications, in particular the monitoring of nuclear reactors.

The response time of an RTD is a parameter generally defined at the time lag required for the RTD to indicate 63 percent of an increasing or decreasing step change in the environmental temperature. The response time is related to the heat transfer coefficients and the thermal masses of the RTD construction. In temperature measurements where the temperature varies slowly as a function of time, the response time of an RTD is not critical. However, in some process applications, and in particular in nuclear reactors, the RTD's response characteristics to sudden changes in temperature are most important to insure safe and efficient operation of the nuclear process being monitored. In such practical applications, corrosion buildup, element contact and other deteriorating effects can markedly change the response characteristics of an RTD. For this reason, various methods have been devised for determining the response characteristics of RTD's in a measurement location. These methods consist of (1) removing the piping section that the RTD is attached to and testing it in an off-line water test loop; (2) producing a known step change in the process temperature and observing the resultant response of the RTD; and (3) a method which uses a computer program to compare the response characteristics of one type of RTD to another during a reactor shutdown which results in a sharp drop in monitored temperatures (scram condition).

Laboratory testing of an in-process RTD requires its removal from the process environment which affects the true results due to the disturbance of the existing conductive film. It is also very costly and, where the RTD is positioned in a nuclear environment, may involve considerable radiation exposure to working personnel. The computer program is only effective during rapid changes of process temperatures and makes a major assumption that the reference RTD's have not changed their characteristics. It is not always possible to produce a known step change in the process temperature so that this method is not readily available.

It is therefore an object of this invention to provide an improved method of measuring the RTD response time.

Another object of this invention is to provide a method of measuring RTD response time which does not require removal of the RTD from its environment.

Another object of this invention is to provide a method for measuring RTD response time which does not require changes in the process being monitored.

BRIEF DESCRIPTION OF THE INVENTION

In practicing this invention, means are provided for passing a current through the resistive element of the RTD to develop an increase in temperature at the resistive element. When this temperature increase is stabilized, the heating current is removed and the time required for the temperature to drop to a predetermined level is measured. The time required for the temperature of the resistance element to reach thermal equilibrium for the step change in power dissipation in the resistance element (self heat) is dependent not only on the film conductivity but the specific heat of the film, resistance element, and RTD body material. Likewise, if either the source temperature or sink temperature were changed abruptly, the time required for a new equilibrium temperature gradient to be established through the RTD body is dependent on the same parameters. As the response time to establish a thermal equilibrium temperature gradient through the RTD involves the same thermal parameters whether the change in thermal gradient is caused by a change in excitation energy, sink or source temperature, the response times can be correlated, so that changes in film thermal conductivity or changes in specific heat which affect one response time also affect the other response time. Thus, by measuring the response time to abrupt changes in the temperature of the resistance element caused by self-heating, the response time of the RTD to changes in either the sink or source temperature can also be determined.

BRIEF DESCRIPTION OF THE DRAWINGS

The invention is illustrated in the drawings, of which:

FIG. 5 is a curve showing the output voltage from the systems of FIGS. 4 and 6;

FIG. 6 is a detailed block diagram of a system for determining the time response of a resistance temperature detector;

FIG. 7 is a partial block diagram and partial schematic of a Wheatstone bridge circuit used in this invention; and FIG. 8 is a partial schematic and partial block diagram of a track and hold and comparator circuit used with this invention.

DETAILED DESCRIPTION OF THE INVENTION

Figure 1:
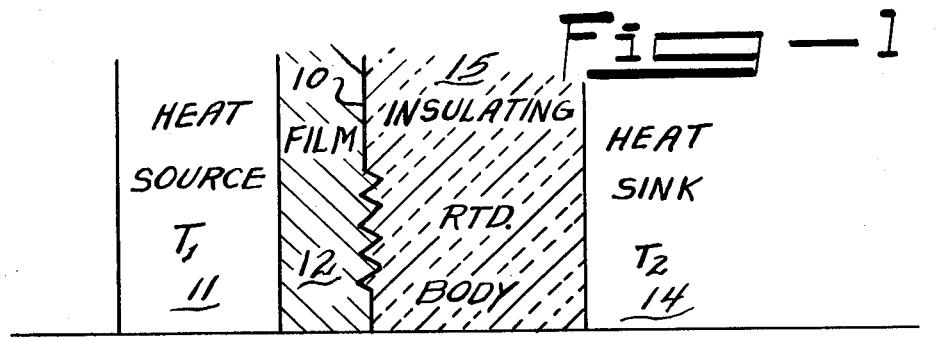
FIGS. 1 to 3 illustrate the temperature distribution in a resistance temperature detector.
Figure 2:
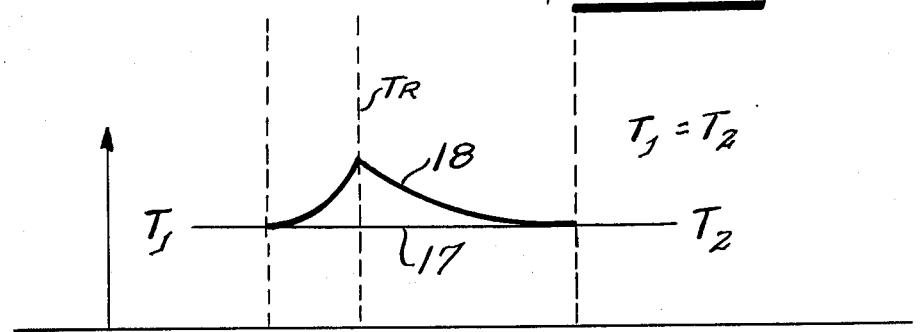
Figure 3:
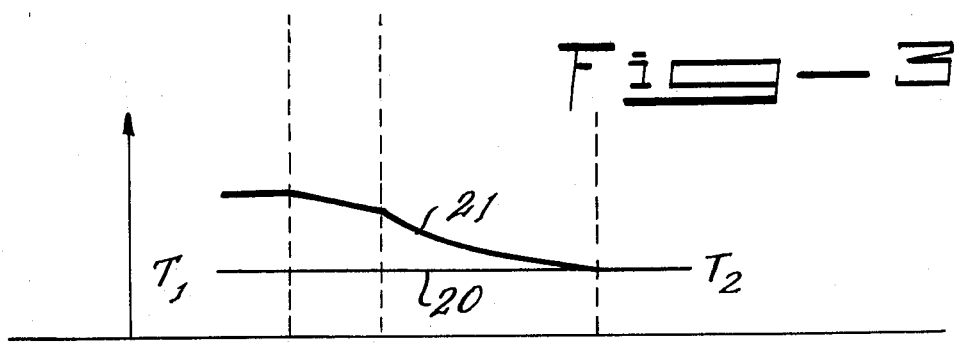

Referring to FIG. 1, there is shown a simplified cross section of an RTD with FIGS. 2 and 3 showing the temperature gradients through the RTD corresponding directly to the position in FIG. 1. The RTD resistance element 10 is separated from the heat source 11 by a film 12 with high thermal conductivity and low electrical conductivity. The RTD resistance element 10 is separated from the heat sink 14, which is at the environmental temperature T2, by the thermal and electrically insulating RTD body 15.

Referring to FIG. 2, the effect of self-heat (excitation energy) can be readily seen, assuming that T1 and T2 are equal. Under this condition with no excitation of the RTD element, the temperature at the resistance element $T_R$ equals T1 equals T2, which is curve 17. If, however, the resistance element is excited, power is dissipated at the element, raising its equilibrium temperature above T1 and T2 an amount related to the power being dissipated by the element, the thermal conductivity of the film and RTD insulating body. This is shown by curve 18 of FIG. 2. FIG. 3 shows the thermal gradient through the RTD body for the case where T1 equals T2, curve 20, and where T1 is greater than T2, curve 21, assuming no self-heat effect.

The time required for the temperature of the resistance element to reach thermal equilibrium for a step change in power dissipation in the resistance element (self-heat) is dependent not only on the film conductivity but the specific heat of the film, resistance element and RTD body material. Likewise, if either the source temperature T1 or sink temperature T2 where changed abruptly (FIG. 3), the time required for a new equilibrium temperature gradient to be established through the RTD body would be dependent on the same parameters. As the response time to establish an equilibrium temperature gradient through the RTD involves the same thermal parameters whether the change in thermal gradient is caused by a change in excitation energy, sink or source temperature, it has been shown that two response times can be correlated and that changes in film thermal conductivity or changes in specific heat affecting one affects the other.

Figure 4:
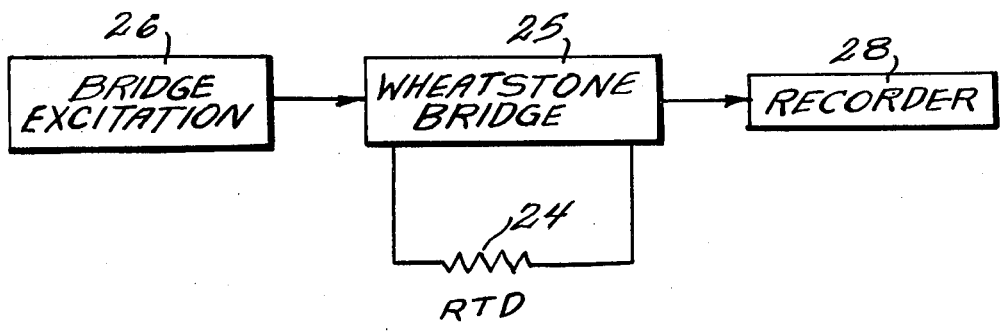
FIG. 4 is a block diagram of a system for determining the time response of a resistance temperature detector.
Figure 3:
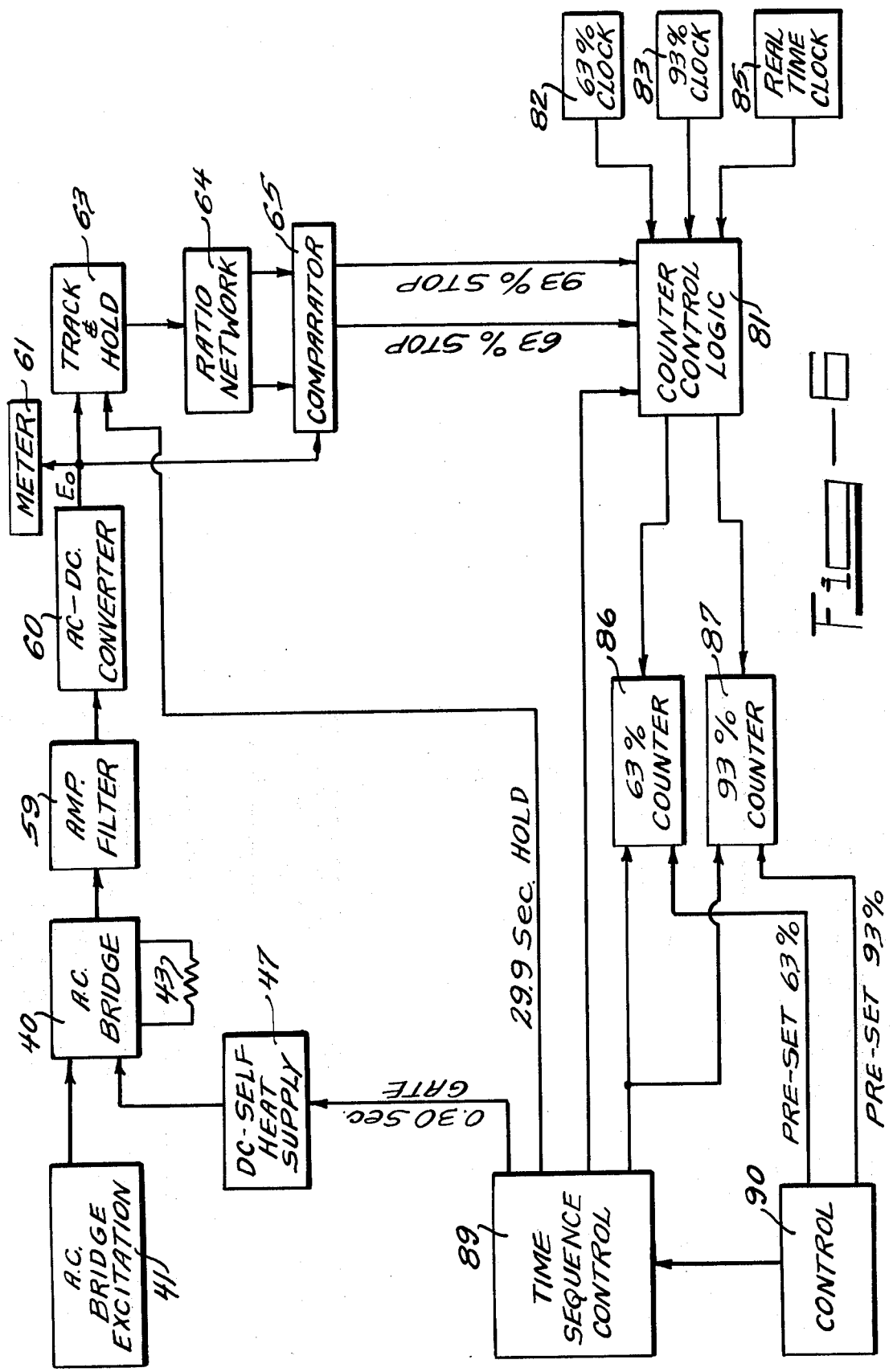

Referring to FIGS. 4 and 5 together, there is shown a method by which the response time of an RTD unit can be measured. As shown in FIG. 4, the RTD unit 24 is a part of a Wheatstone bridge circuit 25 which is used to measure the resistance of the RTD. To measure the resistance of the RTD and thus the temperature of the RTD, the Wheatstone bridge is balanced in a normal manner with the impedance changes required in other arms of the bridge to null the bridge giving a parameter which is a function of the RTD temperature. The bridge is electrically excited by the bridge excitation circuit 26 and the output of bridge 25 can be recorded on recorder 28.

FIG. 5 shows an output tracing which could be taken from the recorder 28. The bridge output voltage E is plotted against time. The portion of the curve labeled 30 represents the adjustment of the bridge to a zero or null voltage 31. At time $t_1$ a step change in process temperature is initiated, causing the bridge output voltage to rise, curve portion 32, to an equilibrium voltage 34 at time $t_2$. At time $t_3$, another step change in the temperature measured by the RTD is initiated. In this example, the temperature is returned to the original temperature at time $t_1$. As shown by the curve portion 35, the bridge output voltage returns to a null value at time $t_6$. The temperature response of the RTD is shown by the curves 32 and 35 which are substantially identical. The response times for the 63 percent point ($t_4$) and the 93 percent point ($t_5$) can be measured directly from the curve. This, however, is a laborious and time-consuming procedure, so that it is not satisfactory when large numbers of RTD instruments must be periodically tested. It also requires that the temperature measured by the RTD be subjected to a step change, a procedure which is not always possible nor desirable.

In FIG. 6 there is shown a block diagram of a device with which the RTD measurements can be carried out automatically and in real time. An AC Wheatstone bridge 40 is excited with an AC signal from the AC bridge excitation circuit 41. RTD 43, the RTD whose time constant is to be measured, is part of the Wheatstone bridge circuit. The AC signal from the Wheatstone bridge is filtered in filter 59 and converted to a DC signal in AC to DC converter 60. This signal, $E_O$, is the bridge output voltage E of FIG. 5. A DC self-heat supply 47 is coupled to the AC bridge in a manner which permits the DC current to flow through RTD 43 to heat the RTD.

In FIG. 7 there is shown in detail the Wheatstone bridge circuit 40, AC bridge excitation 41 and DC self heat supply 47 of FIG. 6. The AC excitation signal is coupled from the excitation circuit 41 to transformer 42. The secondary 44 of transformer 42 is coupled across the bridge circuit which consists of resistors 45, 46, 48, 49 and RTD 43. The output of the bridge is taken across resistor 49 which is coupled to primary 53 of transformer 52. The output of transformer 52 is coupled to filter 59 of FIG. 6. The Wheatstone bridge circuit 40 of FIG. 7 is well known in the art. With changes in the temperature of RTD 43 the balance of the bridge is changed. The bridge is rebalanced by changing the resistance of resistor 48.

The DC self heat supply 47 includes a DC current supply 55 and a switch 56. At the desired time a signal from the time sequence control 89 acts to turn on the switch so that a DC current flows through RTD 43. The DC current flows through the other resistors of the bridge also but the characteristics of these resistors are selected so that there is no effective change in these values due to the DC current which heats RTD 43. Capacitor 54 is a blocking capacitor which permits the AC excitation current to flow through the bridge as required but blocks the DC current. While in this example an AC exciting signal and DC self-heat current are used, in order to keep the two signals separate, it is not necessary that this combination be used. For example a DC exciting signal and an AC self-heat current could be used. Also, AC signals of different frequencies could be used for the two signals.

The method by which this instrument determines the response characteristics of an RTD will be described as follows. The RTD to be measured is fixed to a constant temperature heat source, typically in the on-process case, the monitored process temperature. Thus the RTD does not have to be removed from its normal position and a time constant measurement can be carried out at any time, provided the monitored temperatures remain constant during the measuring time interval. The AC bridge 40 is balanced to produce a null output voltage $E_O$ on meter 61. This balancing output voltage is shown as voltage levels 30 and 31 in FIG. 5. At time $t_1$, a DC heating current is passed through the RTD, raising the RTD element resistance and off-balancing the bridge proportional to the self-heat error of the RTD, as shown by curve 32. When equilibrium conditions are established just prior to time $t_2$, the bridge output voltage is at its peak $E_P$, as shown by voltage level 34. At this point, the DC self-heating supply is turned off and the RTD cools to its starting temperature. As the RTD cools, the output voltage from the AC bridge drops, as shown by voltage level 35. At time $t_3$ when the DC self-heating supply to the RTD is turned off, a timer is started and the timer is stopped at time $t_4$ when the voltage level reaches $E_1 = 0.37\ E_P$. The timer gives a time interval which is proportional to the response time of the RTD. As will be described in a later portion of the specification, the timer can also be adjusted so as to give the response time of the RTD directly. As shown in FIG. 5, a timer can also be used to time the interval $t_3$ to $t_5$ where the output voltage $E_2 = 0.07\ E_p$.

Referring again to FIG. 6, the track and hold circuit 63 receives the output signal from the AC bridge $E_O$ and tracks this signal during the time interval $t_1$ to $t_2$. At $t_2$ the track and hold circuit holds the value of $E_p$ which is the peak value of $E_O$. The ratio network 64 develops output voltages which are equal to 0.37 $E_P$ for the 63 percent response time and 0.07 $E_P$ for the 93 percent response time. With the DC self-heat 47 supply turned off, the output voltage $E_O$ drops and this voltage is compared in comparator 65 with the voltages from ratio network 64. When $E_O$ drops to the value $E_1 = 0.37\ E_P$, a 63 percent stop signal is developed. When $E_O$ drops to $E_2 = 0.07\ E_P$, a 93 percent stop signal is developed.

Referring to FIG. 8, there is shown a partial schematic and partial block diagram of the track and hold circuit 63, ratio network 64 and comparator 65. The $E_O$ signal is fed to amplifier 68 through gate 67. Gate 67 is enabled by a 29.9 second hold signal which is received during the time the self-heating of the RTD takes place. The $E_O$ signal which is applied to amplifier 68 is also applied to capacitor 69 and this voltage is stored on capacitor 69. At the end of 29.9 seconds, gate 67 is disabled and the voltage level on capacitor 69 appears at the output of amplifier 68. Amplifier 68 has a very high input impedance so that the peak voltage level $E_P$ which is on capacitor 69 remains essentially constant during the measuring process. The output voltage from amplifier 68 $E_P$, is coupled to the voltage divider networks 71, 72, 73 and 76 and 77. The voltage divider networks 71, 72 and 73 are adjusted so that the input to capacitor 75 is a voltage which is 0.37 × $E_P$. The voltage divider 76, 77 is adjusted so that the input from the voltage divider to comparator 79 is 0.07 × $E_P$. $E_O$ is also applied directly to comparator 75 and 79. Comparator 75 and 79 are biased so that, with $E_O$ greater than the voltages applied from the voltage dividers, there is no output from the comparator. When the voltage $E_O$ drops below the voltage applied from the voltage dividers to comparator amplifiers 75 and 79, an output signal is developed. The output signal from operational amplifier 75 is the 63 percent stop signal and the output signal from operational amplifier 79 is the 93 percent stop signal.

Referring again to FIG. 6, the 63 percent stop signal and 93 percent stop signal from capacitor 65 are applied to counter control logic 81. Other inputs to counter control logic 81 are from the 63 percent clock 82, 93 percent clock 83 and real time clock 85. The output from counter control logic 81 is coupled to a 63 percent counter 86 and a 93 percent counter 87. The clock signals from clocks 82, 83, and 85 are in the form of pulses which are counted by counters 86 and 87 to determine the time intervals representing the RTD time response. Counters 86 and 87 act to measure the response time at the 63 percent point and the 93 percent point, respectively.

Other elements in the system shown in FIG. 6 are the time sequence control unit 89 and the control unit 90. Time sequence control unit 89 provides appropriate control signals at the proper time to synchronize the operation of the system. Control 90 provides the control signals to start time sequence control 89 and to preset counters 86 and 87.

The response time of the RTD under self-heat conditions is not necessarily equal to the response time of the RTD to a step change in temperature but is proportional to the response time to a step change in temperature. This proportionality is variable according to the construction of the RTD and in an example the proportionality was expressed by; $DT = 0.2 + 2SH$ where $DT$ is the 63 percent delta temperature response in seconds due to a step change in the monitored process temperature and $SH$ the 63 percent self-heat response. Thus, in order to read the 63 percent delta temperature response directly when using the RTD self-heating process to perform the measurement, it is necessary to correct for this proportionality. In the device shown in FIG. 6, counters 86 and 87 are preset with the constant proportionality term required. In addition, clocks 82 or 83 are used in place of the real time clock 85. Clocks 82 and 83 are variable and can be set to run at a rate which will give the correct relationship between the self-heating response time and the delta temperature response time. The necessary signals for presetting the counters 86 and 87 can be obtained from control 90.

Time sequence control 89 as shown in FIG. 6 develops four signals. The reset signal resets the counters to the preset conditions as established by control 90. The 0 to 30 second gate turns on the DC self-heating supply 47 and holds it on for 30 seconds. The 29.9 second hold signal enables gate 67 (FIG. 8) at the same time the 0 to 30 second gate signal turns on the DC self-heat supply. At the end of 29.9 seconds, the hold signal disables gate 67. Gate 67 is thus disabled just prior to the turn-off of the DC self-heat supply and any transients which may appear on the output $E_O$ from AC to DC converter 60 are thus not applied to capacitor 69 (FIG. 8). At the end of the 0 to 30 second gate, a start counter signal is applied to counter control logic 81 to start the coupling of the various clock signals into counters 86 and 87 as required. When $E_O$ drops to the 63 percent response time or the 93 percent response time, the appropriate stop signals from comparator 65 stop the clock signals from reaching counters 86 and 87. The counters 86 and 87 can then be read to give the self-heat response time or the delta temperature response time directly as desired.

The embodiments of the invention in which an exclusive property or privilege is claimed are defined as follows:

1. A time response measuring device for a resistance temperature detector, said time response measuring device comprising, resistance measuring means coupled to the resistance temperature detector, said resistance measuring means being in the form of a bridge circuit with the resistance temperature detector as one of the bridge arms, said resistance measuring means including an exciting current supply coupled to said bridge circuit for providing an exciting signal thereto, said resistance measuring means further including means for balancing said bridge circuit whereby said resistance measuring means develops an output signal $E_1 = 0$ with the resistance temperature detector at a first temperature, control means for developing a first time signal and a second time signal a predetermined time interval after said first time signal, self-heat current supply means coupled to said control means and to the resistance temperature detector for supplying a self-heat current thereto for said predetermined time interval in response to said first and second time signals with the frequency of said self-heat current being different from the frequency of said exciting signal, said self-heat current acting to increase the temperature of the resistance temperature detector to a second temperature whereby said resistance measuring means develops an output signal $E_2$ at the end of said predetermined time interval, said temperature of the resistance temperature detector changing from said second temperature to said first temperature after said predetermined time interval, signal measuring means coupled to said resistance measuring means and said control means, said signal measuring means acting to measure $\Delta E = E_2 - E_1$, said resistance measuring means further acting to develop a varying output signal $E_3$ as the temperature of the resistance temperature detector changes from said second temperature to said first temperature, said signal measuring means being responsive to $E_3$ equal to a predetermined signal $E_4$ to develop a third time signal where $E_4$ is equal to $E_1$ plus a predetermined percentage of $\Delta E$, timing means coupled to said control means and said signal measuring means and responsive to said second and third time signals to measure the time interval therebetween to determine the time response of the resistance temperature detector.

2. A method of measuring the response time of a resistance temperature detector including the steps of:
   a. establishing the resistance temperature detector at a first temperature and measuring the value of the resistance of said resistance temperature detector at said first temperature with a bridge circuit with the resistance temperature detector being one arm of said bridge circuit, said bridge circuit being excited by an AC signal,
   b. adding electric energy to said resistance temperature detector with a DC signal to increase the temperature thereof to a second temperature and measuring said value of resistance of said resistance temperature detector at said second temperature,
   c. stopping the addition of energy to the resistance temperature detector to permit the temperature thereof to change from said second temperature to said first temperature, and
   d. measuring the time required for said value of resistance of said resistance temperature detector to change a predetermined percentage of the difference between said value of resistance at said first temperature and said value of resistance at said second second temperature to measure the response time of said resistance temperature detector.

3. The time response measuring device of claim 1 wherein, said exciting signal is AC and said self-heat current is DC.

4. The time response measuring device of claim 3 wherein, said signal measuring means includes a track and hold circuit for receiving and storing said output signal $E_2$, said signal measuring means further having ratio network means coupled to said track and hold circuit and comparator means coupled to said signal measuring means and said ratio network means, said ratio network means acting to develop said signal $E_4$ as a predetermined percentage of $\Delta E$, said comparator means being responsive to $E_3 = E_4$ to develop said third time signal.

5. The time response measuring device of claim 4 wherein, said timing means has a variable timing rate to compensate for heating the resistance temperature detector with said self-heat current.

6. The time response measuring device of claim 5 wherein, said second time signal has a first portion and a second portion which occurs after said first portion, said self-heat current supply means being responsive to said second portion of said second time signal to establish the end of said predetermined time interval and said signal measuring means being responsive to said first portion of said second time signal to establish the value $E_2$, said resistance measuring means including filter means for separating said AC exciting signal from said DC self-heat current and AC to DC converting means for converting said AC exciting signal to DC whereby said output signals are DC.

7. The time response measuring device of claim 1 wherein, said exciting signal is DC and said self-heat current is AC.

* * * * *